US012673661B2

(12) United States Patent　　　　　　(10) Patent No.:　US 12,673,661 B2

Hattaha et al.　　　　　　　　　　　(45) Date of Patent:　　　Jul. 7, 2026

---

(54) VEHICLE CONTROL DEVICE TO TRANSITION FROM A FIRST TRAVEL MODE TO A SECOND TRAVEL MODE BASED ON CONTINUATION OF A STATE FOR A PREDETERMINED DELAY TIME

(71) Applicant: HONDA MOTOR CO., LTD., Tokyo (JP)

(72) Inventors: Kenichi Hattaha, Tokyo (JP); Naoyuki Tanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 18/766,696

(22) Filed: Jul. 9, 2024

(65) Prior Publication Data

US 2025/0100537 A1　　Mar. 27, 2025

(30) Foreign Application Priority Data

Sep. 27, 2023　(JP) ................................. 2023-166361

(51) Int. Cl.
B60W 20/10　　　(2016.01)
B60K 6/46　　　(2007.10)
(Continued)

(52) U.S. Cl.
CPC ............ B60W 20/10 (2013.01); B60W 10/06 (2013.01); B60W 10/08 (2013.01); B60K 6/46 (2013.01);
(Continued)

(58) Field of Classification Search
CPC ...... B60W 20/10; B60W 10/06; B60W 10/08; B60W 2520/10; B60W 2530/10;
(Continued)

(56) References Cited

U.S. PATENT DOCUMENTS

| | | | |
|---|---|---|---|
| 2010/0312427 A1 | 12/2010 | Ueno | |
| 2013/0144514 A1 | 6/2013 | Choi et al. | |
| 2019/0105993 A1* | 4/2019 | Fujiyoshi | .............. B60W 20/10 |

FOREIGN PATENT DOCUMENTS

| | | | |
|---|---|---|---|
| JP | 5680279 B2 | 3/2015 | |
| JP | 6023480 B2 | 11/2016 | |

(Continued)

*Primary Examiner* — Brian P Sweeney
(74) *Attorney, Agent, or Firm* — Paratus Law Group, PLLC

(57)　　　　　　　ABSTRACT

A vehicle travels in any travel mode among a plurality of travel modes including a first travel mode of stopping actuation of an internal combustion engine and traveling by an electric motor driving a drive wheel depending on power supply from a power storage device, and a second travel mode of actuating the internal combustion engine and traveling by the electric motor driving the drive wheel depending on at least the power supply from an electric generator. A processor of the vehicle is configured to: when the vehicle is in the first travel mode, transition from the first travel mode to the second travel mode based on continuation of a state for a predetermined delay time, the state being a state where a vehicle-required power required in the vehicle exceeds a threshold; and change the predetermined delay time depending on a remaining amount of the power storage device.

6 Claims, 5 Drawing Sheets

(51) Int. Cl.
  B60W 10/06 (2006.01)
  B60W 10/08 (2006.01)

(52) U.S. Cl.
  CPC ..... *B60W 2520/10* (2013.01); *B60W 2530/10*
    (2013.01); *B60Y 2200/92* (2013.01)

(58) Field of Classification Search
  CPC ......... B60W 30/188; B60W 2510/305; B60W
    20/40; B60W 50/0097; B60W 50/06;
    B60W 20/11; B60W 20/13; B60W
    2510/244; B60W 2540/10; B60K 6/46;
    B60K 6/442; B60Y 2200/92; Y02T 10/62
  See application file for complete search history.

(56) References Cited

FOREIGN PATENT DOCUMENTS

| | | | |
|---|---|---|---|
| JP | 6881210 B2 | 6/2021 | |
| JP | 2022007660 A * | 1/2022 | ............ B60W 20/13 |

* cited by examiner

VEHICLE CONTROL DEVICE TO TRANSITION FROM A FIRST TRAVEL MODE TO A SECOND TRAVEL MODE BASED ON CONTINUATION OF A STATE FOR A PREDETERMINED DELAY TIME

CROSS-REFERENCE TO RELATED APPLICATIONS

This application is based on and claims priority under 35 USC 119 from Japanese Patent Application No. 2023-166361 filed on Sep. 27, 2023, the contents of which are incorporated herein by reference.

TECHNICAL FIELD

The present disclosure relates to a vehicle control device.

BACKGROUND

In recent years, as a specific countermeasure against global climate change, efforts for realizing a low-carbon society or a decarbonized society have become active. Also in the field of vehicles such as automobiles, research and development of electrification technology for electrifying the drive sources thereof are in progress in order to reduce the amount of $CO_2$ emission and improve the energy efficiency. Specifically, electric vehicles using an electric motor as a drive source, such as electrical vehicles or hybrid electrical vehicles, have been developed.

Japanese Patent Publication No. 6881210 discloses a technique of, in a hybrid vehicle configured to switch from EV travel to HV travel when the SOC of the power storage device is equal to or less than a threshold, increasing the threshold when the power required during the EV travel is equal to or higher than a travel power based on the maximum output of the engine.

Japanese Patent Publication No. 5680279 discloses a technique of, in a hybrid vehicle, changing the mode from an HEV travel mode to an EV travel mode after a delay time set depending on the deceleration of the vehicle has elapsed.

Japanese Patent Publication No. 6023480 discloses a technique of, in a hybrid vehicle, starting the engine after a first set time has elapsed if a required output power is greater than a predetermined engine delay startup power and smaller than a predetermined engine non-delay startup power.

However, the related art excessively transitions from a first travel mode of stopping the actuation of an internal combustion engine and traveling by an electric motor driving drive wheels depending on the power supply from a power storage device, to a second travel mode of actuating the internal combustion engine and traveling by the electric motor driving the drive wheels depending on at least the power supply from an electric generator.

This may deteriorate the NV (noise, vibration) characteristics and the fuel efficiency of the vehicle.

An object of the present disclosure is to provide a vehicle control device capable of limiting excessive transitions from a first travel mode of stopping the actuation of an internal combustion engine and traveling by an electric motor driving drive wheels depending on the power supply from a power storage device, to a second travel mode of actuating the internal combustion engine and traveling by the electric motor driving the drive wheels depending on at least the power supply from an electric generator. This further contributes to improvement in energy efficiency.

SUMMARY

An aspect of the present disclosure relates to a vehicle control device configured to control a vehicle including an internal combustion engine, an electric generator configured to be driven by the internal combustion engine, a power storage device, and an electric motor configured to drive a drive wheel depending on power supply from at least one of the electric generator or the power storage device, the vehicle is configured to travel in any travel mode among a plurality of travel modes including a first travel mode of stopping actuation of the internal combustion engine and traveling by the electric motor driving the drive wheel depending on the power supply from the power storage device, and a second travel mode of actuating the internal combustion engine and traveling by the electric motor driving the drive wheel depending on at least the power supply from the electric generator, and the vehicle control device includes a processor configured to:

when the vehicle is in the first travel mode, transition from the first travel mode to the second travel mode based on continuation of a state for a predetermined delay time, the state being a state where a vehicle-required power required in the vehicle exceeds a threshold; and change the predetermined delay time depending on a remaining amount of the power storage device.

According to the present disclosure, it is possible to provide a vehicle control device capable of limiting excessive transitions from a first travel mode of stopping the actuation of an internal combustion engine and traveling by an electric motor driving drive wheels depending on the power supply from a power storage device, to a second travel mode of actuating the internal combustion engine and traveling by the electric motor driving the drive wheels depending on at least the power supply from an electric generator. This can further contribute to improvement in energy efficiency.

BRIEF DESCRIPTION OF DRAWINGS

Exemplary embodiments of the present disclosure will be described in detail based on the following figures, wherein.

DESCRIPTION OF EMBODIMENTS

Figure 1:
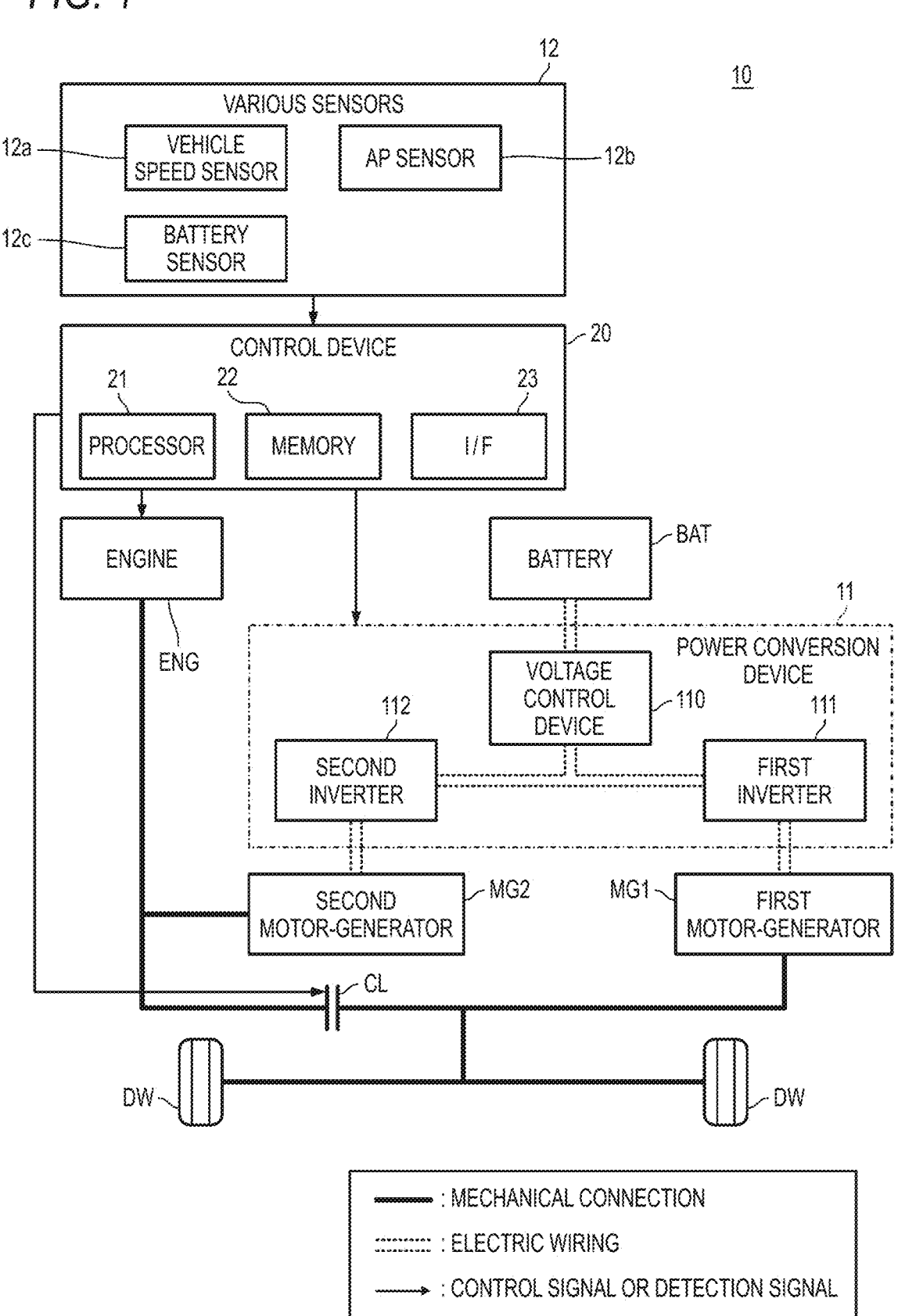
FIG. 1 is a diagram illustrating a schematic configuration of a vehicle 10 according to the present embodiment.

Hereinafter, an embodiment of a vehicle control device according to the present disclosure will be described in detail with reference to the drawings. Not all the features to be described in the following embodiments are not necessarily essential for the present disclosure. Two or more features among a plurality of features to be described in the following embodiment may be combined as desired. Hereinafter, the same or similar elements are denoted by the same or similar reference numerals, and description thereof may be appropriately omitted or simplified.

Vehicle

First, a vehicle including a control device (control device 20 to be described later), which is an embodiment of a vehicle control device of the present disclosure, will be described.

As illustrated in FIG. 1, the vehicle 10 of the present embodiment is a hybrid electric vehicle, and includes an engine ENG, a first motor-generator MG1, a second motor-generator MG2, a battery BAT, a clutch CL, a power conversion device 11, various sensors 12, and a control device 20. In FIG. 1, thick solid lines indicate mechanical connections, double dashed lines indicate electrical wiring, and thin solid arrows indicate transmission and reception of control signals or detection signals.

The engine ENG is, for example, an internal combustion engine such as a gasoline engine or a diesel engine, and outputs power generated by burning supplied fuel. The engine ENG is coupled to the second motor-generator MG2 and is coupled to drive wheels DW of the vehicle 10 via the clutch CL. The power output by the engine ENG (hereinafter, also referred to as "output of the engine ENG") is transmitted to the second motor-generator MG2 when the clutch CL is disengaged, and is transmitted to the second motor-generator MG2 and the drive wheels DW when the clutch CL is connected (engaged). The second motor-generator MG2 and the clutch CL will be described later.

The first motor-generator MG1 is a motor-generator (so-called "traction motor") mainly used as a drive source of the vehicle 10. The first motor-generator MG1 is electrically connected to the battery BAT and the second motor-generator MG2 via the power conversion device 11. The first motor-generator MG1 is supplied with electric power from at least one of the battery BAT or the second motor-generator MG2. When supplied with power, the first motor-generator MG1 operates as an electric motor and outputs electric power for the vehicle 10 to travel. The first motor-generator MG1 is coupled to the drive wheels DW, and the power output from the first motor-generator MG1 (hereinafter, also referred to as "output of the first motor-generator MG1") is transmitted to the drive wheels DW. The vehicle 10 travels when at least one of the output of the engine ENG or the output of the first motor-generator MG1 is transmitted to the drive wheels DW.

When the vehicle 10 brakes, the first motor-generator MG1 may regenerate as an electric generator to generate electric power (so-called regenerative power generation). The electric power generated by the regeneration of the first motor-generator MG1 (hereinafter, also referred to as "regenerated power") is supplied to the battery BAT through the power conversion device 11, for example. Thus, the battery BAT can be charged by the regenerated power.

The regenerated power may be not supplied to the battery BAT but supplied to the second motor-generator MG2 via the power conversion device 11. By supplying the regenerated power to the second motor-generator MG2, it is possible to perform "power waste" of consuming the regenerated power without charging the battery BAT. Upon power waste, the regenerated power supplied to the second motor-generator MG2 is used for driving the second motor-generator MG2. The power generated thereby is input to the engine ENG and thus is consumed by the mechanical friction loss of the engine ENG and the like.

The second motor-generator MG2 is a motor-generator mainly used as an electric generator, and is configured with, for example, an AC motor. The second motor-generator MG2 is driven by the power of the engine ENG to generate electric power. The electric power generated by the second motor-generator MG2 is supplied to at least one of the battery BAT or the first motor-generator MG1 via the power conversion device 11. By supplying the electric power generated by the second motor-generator MG2 to the battery BAT, the battery BAT can be charged by the electric power. Further, by supplying the electric power generated by the second motor-generator MG2 to the first motor-generator MG1, the first motor-generator MG1 can be driven by the electric power.

Further, the second motor-generator MG2 may function as a starter motor for starting the engine ENG. That is, for example, when transitioning from an EV travel mode to a hybrid travel mode, which will be described later, the electric power of the battery BAT is supplied to the second motor-generator MG2, and the second motor-generator MG2 is driven by the electric power to crank the engine ENG, thereby starting the engine ENG.

The power conversion device 11 is a device for converting input electric power and outputting the converted electric power (so-called power control unit; referred to as "PCU" as well), and is connected to the first motor-generator MG1, the second motor-generator MG2, and the battery BAT. For example, the power conversion device 11 includes a first inverter 111, a second inverter 112, and a voltage control device 110. The first inverter 111, the second inverter 112, and the voltage control device 110 are electrically connected to each other.

The voltage control device 110 converts input voltage and outputs the converted voltage. The voltage control device 110 may be a DC/DC converter or the like. For example, when supplying the electric power of the battery BAT to the first motor-generator MG1, the voltage control device 110 boosts the output voltage of the battery BAT and outputs the boosted output voltage to the first inverter 111. For example, when the first motor-generator MG1 performs regenerative power generation, the voltage control device 110 steps down the output voltage of the first motor-generator MG1 received via the first inverter 111 and outputs the voltage to the battery BAT. When the second motor-generator MG2 generates power, the voltage control device 110 steps down the output voltage of the second motor-generator MG2 received via the second inverter 112 and outputs the voltage to the battery BAT.

When the electric power of the battery BAT is supplied to the first motor-generator MG1, the first inverter 111 converts the electric power (direct current) of the battery BAT received via the voltage control device 110 into an alternating current and outputs the alternating current to the first motor-generator MG1. When the first motor-generator MG1 performs regenerative power generation, the first inverter 111 converts the electric power (alternating current) received from the first motor-generator MG1 to a direct current and outputs the direct current to the voltage control device 110. When the regenerated power of the first motor-generator MG1 is to be wasted, the first inverter 111 converts the electric power (alternating current) received from the first motor-generator MG1 to a direct current and outputs the direct current to the second inverter 112.

When the second motor-generator MG2 generates power, the second inverter 112 converts the electric power (alternating current) received from the second motor-generator MG2 to a direct current and outputs the direct current to the voltage control device 110. When the regenerated power of the first motor-generator MG1 is to be wasted, the second inverter 112 converts the regenerated power (direct current) of the first motor-generator MG1 received via the first inverter 111 into an alternating current and outputs the alternating current to the second motor-generator MG2.

The battery BAT is a chargeable and dischargeable secondary battery, and includes a plurality of power storage cells connected in series or series-parallel. The battery BAT is configured to output a high voltage of, for example, 100 [V] to 400 [V]. A lithium-ion battery, a nickel-metal hydride battery, or the like can be used as the storage cell of the battery BAT.

The clutch CL can be connected so that the power transmission path from the engine ENG to the drive wheels DW is connected (engaged), and can be disengaged so that the power transmission path from the engine ENG to the drive wheels DW is disengaged (blocked). The output of the engine ENG is transmitted to the drive wheels DW when the clutch CL is connected, and is not transmitted to the drive wheels DW when the clutch CL is disengaged.

The various sensors 12 are sensors for obtaining various information related to the vehicle 10. As illustrated in FIG. 1, the various sensors 12 include, for example, a vehicle speed sensor 12a for detecting the travel speed of the vehicle 10 (hereinafter, also referred to as "vehicle speed"), an AP sensor 12b for detecting the AP opening (AP: accelerator position), which indicates the operation amount on the accelerator pedal of the vehicle 10, a battery sensor 12c for detecting information related to the battery BAT (for example, the output voltage, the charging and discharging current, and the temperature of the battery BAT), and the like. Detection results from the various sensors 12 are sent to the control device 20 as detection signals.

The control device 20 is a device (computer) for integrally controlling the entire vehicle 10, and is implemented by, for example, an electronic control unit (ECU) including a processor 21 that performs various types of calculation, a memory 22 that stores various types of information, and an I/F 23 (I/F: interface) that controls input and output of data between inside and outside of the control device 20. The control device 20 may be implemented by one ECU or may be implemented by a plurality of ECUs.

The control device 20 is provided to communicate with the engine ENG, the clutch CL, the power conversion device 11, and the various sensors 12. By the processor 21 executing the program stored in a memory 22, the control device 20 controls the output of the engine ENG, controls the power conversion device 11 to control the output of the first motor-generator MG1 and the second motor-generator MG2, and controls the state of clutch CL. Accordingly, the control device 20 can control the travel mode of the vehicle 10 as described later.

For example, when the vehicle 10 travels, the control device 20 derives a required driving force (in other words, a driving force required for the vehicle 10 to travel), which is a target value of the driving force of the vehicle 10, based on the vehicle speed detected by the vehicle speed sensor 12a and the AP opening detected by the AP sensor 12b. The control device 20 controls the output of the engine ENG and/or the first motor-generator MG1 and controls the travel mode of the vehicle 10 such that the driving force of the vehicle 10 becomes the required driving force. The required driving force derived by the control device 20 increases as the vehicle speed increases, and increases as the AP opening increases.

Travel Modes of Vehicle

Here, the travel modes that the vehicle 10 can take will be described. The vehicle 10 may take the travel modes including an EV travel mode, a hybrid travel mode, and an engine travel mode. The vehicle 10 travels according to any one travel mode among the plurality of travel modes. The travel mode for the vehicle 10 to travel is controlled by the control device 20 as described above.

EV Travel Mode

The EV travel mode is an example of a first travel mode in the present disclosure, and is a travel mode of supplying only the electric power of the battery BAT to the first motor-generator MG1 and causing the vehicle 10 to travel by the power output by the first motor-generator MG1 depending on the electric power. The EV travel mode is a travel mode of traveling by driving the drive wheels DW using only the first motor-generator MG1 between the engine ENG and the first motor-generator MG1.

Specifically, in the case of the EV travel mode, the control device 20 disengages the clutch CL. Moreover, in the case of the EV travel mode, the control device 20 stops supplying fuel to the engine ENG to stop the output of power from the engine ENG (hereinafter referred to as "actuation of the engine ENG"). Therefore, in the EV travel mode, the second motor-generator MG2 does not generate electric power. In the EV travel mode, the control device 20 supplies only the electric power of the battery BAT to the first motor-generator MG1, and causes the first motor-generator MG1 to output power according to the electric power to cause the vehicle 10 to travel by the power.

Basically, the control device 20 causes the vehicle 10 to travel in the EV travel mode on condition that electric power required in the vehicle 10 (hereinafter, also referred to as "vehicle-required power") is equal to or less than a predetermined threshold (hereinafter, also referred to as "EV permitted power"). The vehicle-required power in the EV travel mode includes electric power required for the first motor-generator MG1 to cause the vehicle 10 to travel, and changes depending on the required driving force and the vehicle speed.

Hybrid Travel Mode

The hybrid travel mode is an example of a second travel mode in the present disclosure, and is a travel mode of supplying at least the electric power generated by the second motor-generator MG2 to the first motor-generator MG1 and causing the vehicle 10 to travel mainly by the power output by the first motor-generator MG1 depending on the electric power. The hybrid travel mode is a travel mode of traveling by driving the drive wheels DW using only the first motor-generator MG1 between the engine ENG and the first motor-generator MG1.

Specifically, in the case of the hybrid travel mode, the control device 20 disengages the clutch CL. In the case of the hybrid travel mode, the control device 20 supplies fuel into the engine ENG to cause the engine ENG to output power, thereby driving the second motor-generator MG2 by the power of the engine ENG. Thus, in the hybrid travel mode, the second motor-generator MG2 generates electric power. In the hybrid travel mode, the control device 20 disengages the power transmission path by the clutch CL, supplies the electric power generated by the second motor-generator MG2 to the first motor-generator MG1, and causes the first motor-generator MG1 to output power according to the electric power to cause the vehicle 10 to travel by the power.

The electric power supplied from the second motor-generator MG2 to the first motor-generator MG1 is greater than the electric power supplied from the battery BAT to the first motor-generator MG1. Therefore, in the hybrid travel mode, the output of the first motor-generator MG1 can be increased and a great driving force can be obtained as compared with the EV travel mode.

In the case of the hybrid travel mode, the control device 20 may also supply the electric power of the battery BAT to the first motor-generator MG1 as necessary. That is, the control device 20 may supply electric power to the first motor-generator MG1 from both the second motor-generator MG2 and the battery BAT in the hybrid travel mode. Thus, the electric power supplied to the first motor-generator MG1 can be increased and a greater driving force can be obtained as compared with the case where only the electric power of the second motor-generator MG2 is supplied to the first motor-generator MG1.

Engine Travel Mode

The engine travel mode is a travel mode in which the vehicle 10 travels mainly by the power output from the engine ENG, and is a travel mode of traveling by at least the engine ENG driving the drive wheels DW.

Specifically, in the case of the engine travel mode, the control device 20 connects the clutch CL. In the case of the engine travel mode, the control device 20 supplies fuel into the engine ENG and causes the engine ENG to output power. In the case of the engine travel mode, the power transmission path is connected by the clutch CL, so that the power of the engine ENG is transmitted to the drive wheels DW to drive the drive wheels DW. In this way, in the case of the engine travel mode, the control device 20 causes the engine ENG to output power, and causes the vehicle 10 to travel by the power.

In the case of the engine travel mode, the control device 20 may supply the electric power of the battery BAT to the first motor-generator MG1 as necessary. As a result, in the engine travel mode, the vehicle 10 can travel using the power output by the first motor-generator MG1 obtained by the electric power supplied from the battery BAT, and it is possible to obtain a greater driving force as compared with the case where the vehicle 10 travels only by the power of the engine ENG. In addition, the output of the engine ENG can be limited and the fuel efficiency of the vehicle 10 can be improved as compared with the case where the vehicle 10 is caused to travel by only the power of the engine ENG.

Control Performed by Control Device of Present Embodiment

Next, the control performed by the control device 20 is described more specifically.

The vehicle-required power in the EV travel mode may change from moment to moment and may instantaneously exceed the EV permitted power. If the transition from the EV travel mode to the hybrid travel mode is performed even when the vehicle-required power instantaneously exceeds the EV permitted power, the transition from the EV travel mode to the hybrid travel mode may occur at high frequency. The transition from the EV travel mode to the hybrid travel mode involves starting the engine ENG. Therefore, such frequent transitions will lead to deterioration of the NV (noise, vibration) characteristics and the fuel efficiency of the vehicle 10. Accordingly, it is desirable to limit excessive transitions from the EV travel mode to the hybrid travel mode.

In the present embodiment, when the vehicle 10 is in the EV travel mode, the transition from the EV travel mode to the hybrid travel mode is performed based on continuation for a predetermined delay time of a state where the vehicle-required power exceeds the EV permitted power (that is, the predetermined threshold). The delay time is varied depending on to the remaining amount of the battery BAT (hereinafter, also simply referred to as "SOC (state of charge)").

Therefore, according to the present embodiment, it is possible to limit transitions from the EV travel mode to the hybrid travel mode simply because the state where the vehicle-required power exceeds the EV permitted power, even though the SOC is abundant. Accordingly, it is possible to limit excessive transitions from the EV travel mode to the hybrid travel mode, and to prevent the NV characteristics and the fuel efficiency of the vehicle 10 from deteriorating due to such transitions. In addition, according to the present embodiment, the transition from the EV travel mode to the hybrid travel mode can be performed promptly when the SOC is not abundant, thereby preventing excessive reduction of the SOC.

Next, an example of processing executed by the control device 20 when the vehicle 10 is in the EV travel mode will be described with reference to FIGS. 2 and 3. This processing is executed, for example, by the processor 21 of the control device 20 executing a program stored in the memory 22 in advance. The series of processing illustrated in FIG. 2 and the series of processing illustrated in FIG. 3 are repeatedly executed at a predetermined cycle (for example, every 5 [ms]) when the travel mode of the vehicle 10 is the EV travel mode.

Figure 2:
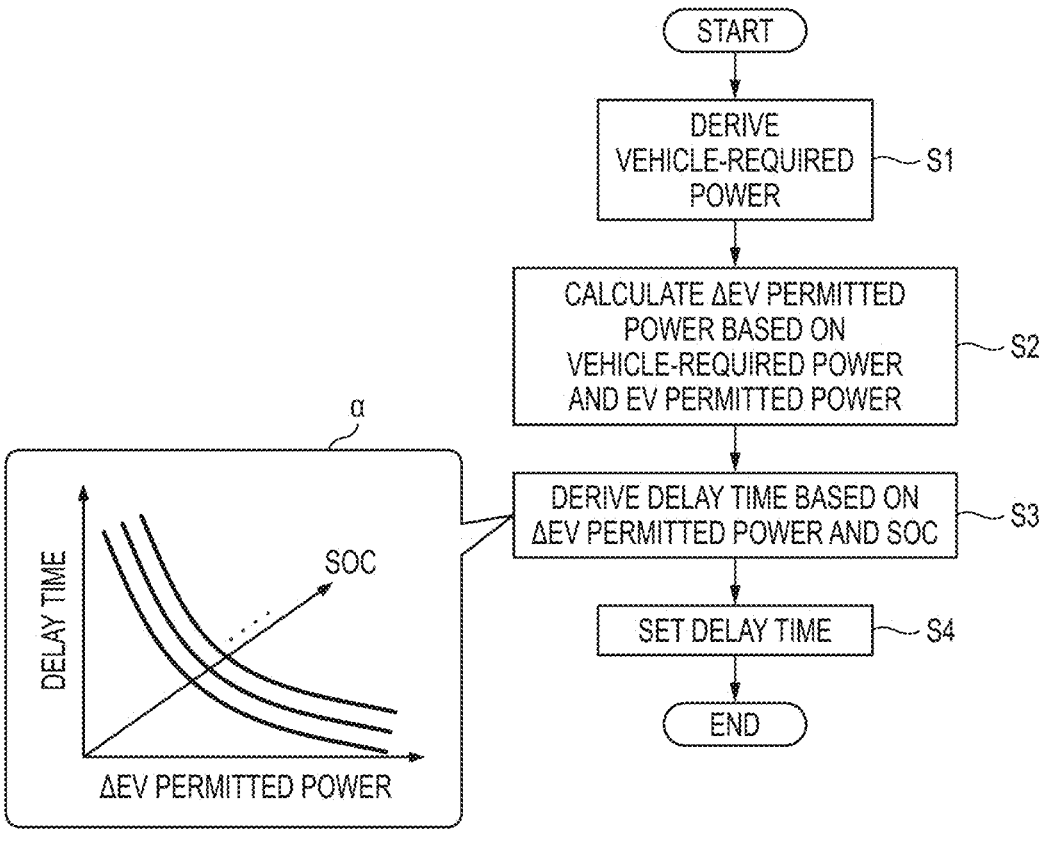
FIG. 2 is a flowchart illustrating an example of processing related to setting a delay time executed by a control device 20 that controls the vehicle 10.
Figure 3:
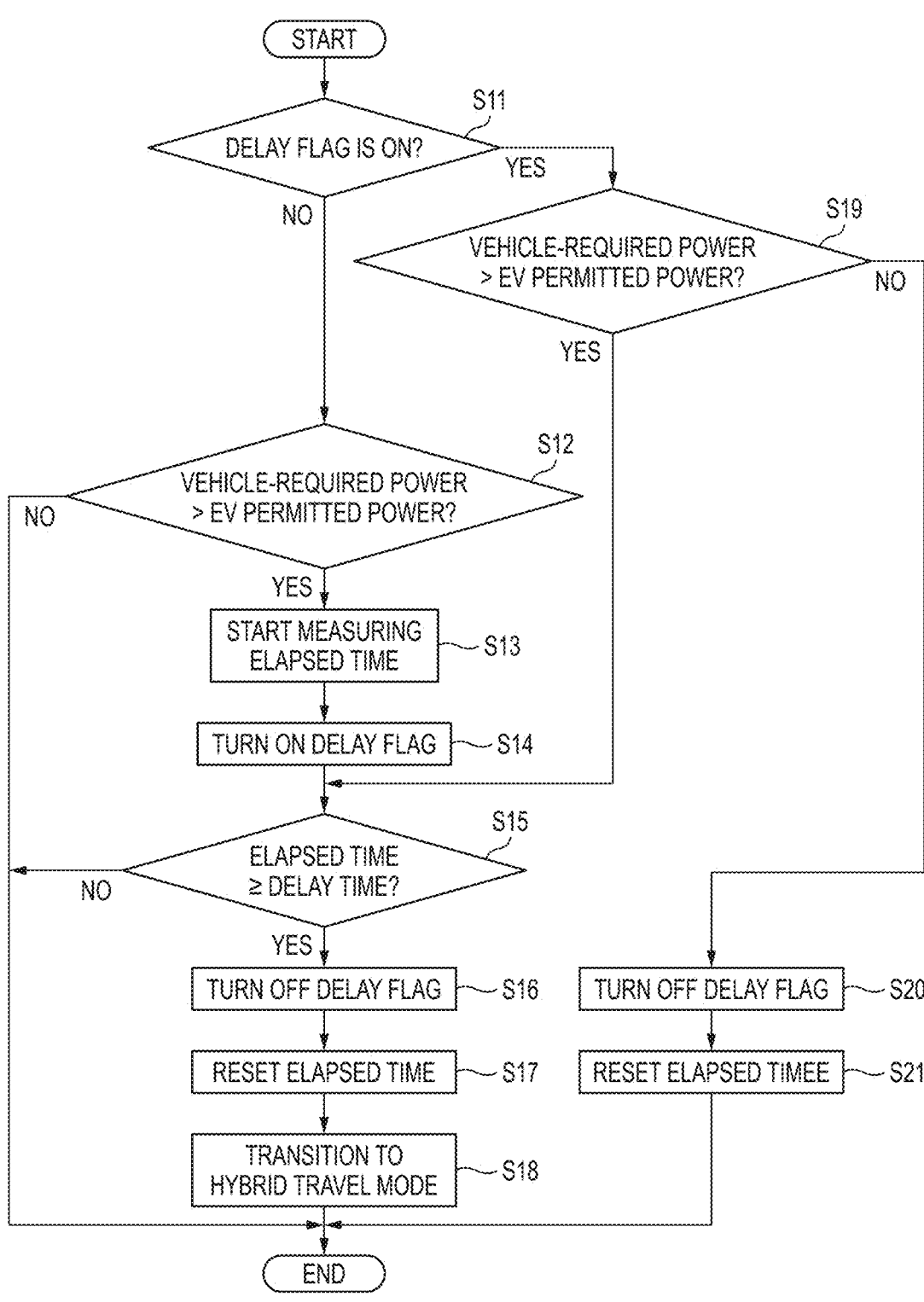
FIG. 3 is a flowchart illustrating an example of processing related to the transition from an EV travel mode to a hybrid travel mode executed by the control device 20 that controls the vehicle 10.

As illustrated in FIG. 2, the control device 20 first derives the vehicle-required power (step S1). The vehicle-required power in the EV travel mode can be derived, for example, based on a TRC torque requested value (TRC: traction), which is the target value of the torque generated from the first motor-generator MG1, and a TRC rotation speed, which is the rotation speed of the first motor-generator MG1. Here, the TRC torque requested value can be obtained from, for example, the required driving force. The TRC rotation speed can be obtained from, for example, the vehicle speed detected by the vehicle speed sensor 12a. The vehicle-required power increases as the TRC torque requested value and the TRC rotation speed increase, in other words, as the required driving force and vehicle speed increase.

The control device 20 may derive the vehicle-required power in consideration of not only the first motor-generator MG1 but also the power consumption of an auxiliary machine (for example, an air conditioner, a cooling device, or the like) of the vehicle 10.

For example, in this case, the various sensors 12 are configured to include a sensor for detecting the power consumption of the auxiliary machine provided in the vehicle 10. The control device 20 obtains the power consumption by the auxiliary machine based on the detection result of this sensor. When the vehicle 10 is in the EV travel mode, the control device 20 derives, as vehicle-required power, the sum of the electric power required by first motor-generator MG1 to cause the vehicle 10 to travel and the obtained power consumption by the auxiliary machine. In this way, it is possible to derive more accurate vehicle-required power on the basis of the electric power actually required in the vehicle 10, and to more appropriately perform various processing using the vehicle-required power. Alternatively, for example, the control device 20 may obtain the power consumption by the auxiliary machine by estimating the power consumption from the operation state of the auxiliary machine or the like.

Next, the control device 20 derives ΔEV permitted power, which is the difference between the vehicle-required power and the EV permitted power, based on the vehicle-required power derived from the processing of step S1 and the EV permitted power set in advance (step S2). In the processing of step S2, the control device 20 derives, for example, a value obtained by subtracting the EV permitted power from the vehicle-required power as the ΔEV permitted power.

Next, based on the ΔEV permitted power derived from the processing of step S2 and the current SOC (that is, the remaining amount of the battery BAT), the control device 20 derives the delay time corresponding to the combination of the ΔEV permitted power and the SOC (step S3). In the processing of step S3, the control device 20 derives the delay time corresponding to the combination of the ΔEV permitted power and the SOC by using, for example, a table (information) for defining the delay time for each combination of the ΔEV permitted power and the SOC or a predetermined calculation formula.

As indicated by, for example, the balloon denoted by the reference sign α in FIG. 2, the delay time derived from the processing of step S3 is designed shorter as the ΔEV permitted power is higher and longer as the SOC is higher. That is, the control device 20 shortens the delay time as the ΔEV permitted power increases, and lengthens the delay time as the SOC increases.

By shortening the delay time as the ΔEV permitted power increases, for example, the transition from the EV travel mode to the hybrid travel mode can be performed promptly when the required driving force is great and the vehicle-required power is great. This can prevent the drivability of the vehicle 10 from deteriorating continuously for a long time in the EV travel mode in which the required driving force cannot be secured. In addition, by lengthening the delay time as the SOC increases, it is possible to prevent the NV characteristics and the fuel efficiency of the vehicle 10 from deteriorating due to excessive transitions from the EV travel mode to the hybrid travel mode as described above. The SOC can be obtained from the detection result of the battery sensor 12c, for example.

Next, the control device 20 sets the delay time derived from the processing of step S3 as one of the conditions as to whether to transition from the EV travel mode to the hybrid travel mode (step S4), and ends the series of processing illustrated in FIG. 2.

As illustrated in FIG. 3, the control device 20 determines whether the delay flag is on (step S11). As will be described in detail later, the delay flag is a flag to be set to on in response to the vehicle-required power exceeding the EV permitted power.

When it is determined that the delay flag is off (step S11: NO), the control device 20 determines whether the vehicle-required power derived by the processing of the latest step S1 is higher than the EV permitted power (step S12). When it is determined that the vehicle-required power is not higher than the EV permitted power (step S12: NO), the control device 20 directly ends the series of processing illustrated in FIG. 3.

When it is determined that the vehicle-required power is higher than the EV permitted power (step S12: YES), the control device 20 starts the measurement of the elapsed time (step S13) and sets the delay flag to on (step S14).

Next, the control device 20 determines whether the elapsed time after the start of the measurement in the processing of step S13 is equal to or longer than the delay time set by the processing of the latest step S4 (step S15). When it is determined that the elapsed time is not equal to or longer than the delay time (step S15: NO), the control device 20 directly ends the series of processing illustrated in FIG. 3.

When it is determined that the elapsed time is equal to or longer than the delay time (step S15: YES), the control device 20 sets the delay flag to off (step S16), and resets the elapsed time after the start of the measurement to "0" by the processing of step S13 (step S17). Then, the control device 20 transitions the travel mode of the vehicle 10 from the EV travel mode to the hybrid travel mode (step S18), and ends the series of processing illustrated in FIG. 3.

When it is determined that the delay flag is on in the processing of step S11 (step S11: YES), the control device 20 determines whether the vehicle-required power is higher than the EV permitted power (step S19) as in the above-described processing of step S12. When it is determined that the vehicle-required power is higher than the EV permitted power (step S19: YES), the control device 20 proceeds to the above-described processing of step S15.

When it is determined that the vehicle-required power is not greater than the EV permitted power (step S19: NO), the control device 20 sets the delay flag to off (step S20), resets the elapsed time after the start of the measurement to "0" by the processing of step S13 (step S21), and ends the series of processing illustrated in FIG. 3.

Specific Example of Travel Mode Transition in Vehicle of Present Embodiment

Next, a specific example of a travel mode transition in the vehicle 10 will be described with reference to FIG. 4. In (a) in FIG. 4, a vertical axis represents the vehicle-required power, and a horizontal axis represents a timing. In (b) of FIG. 4, a vertical axis represents the SOC, and a horizontal axis represents a timing. (c) of FIG. 4 illustrates the travel mode of the vehicle 10 at each timing.

Figure 4:
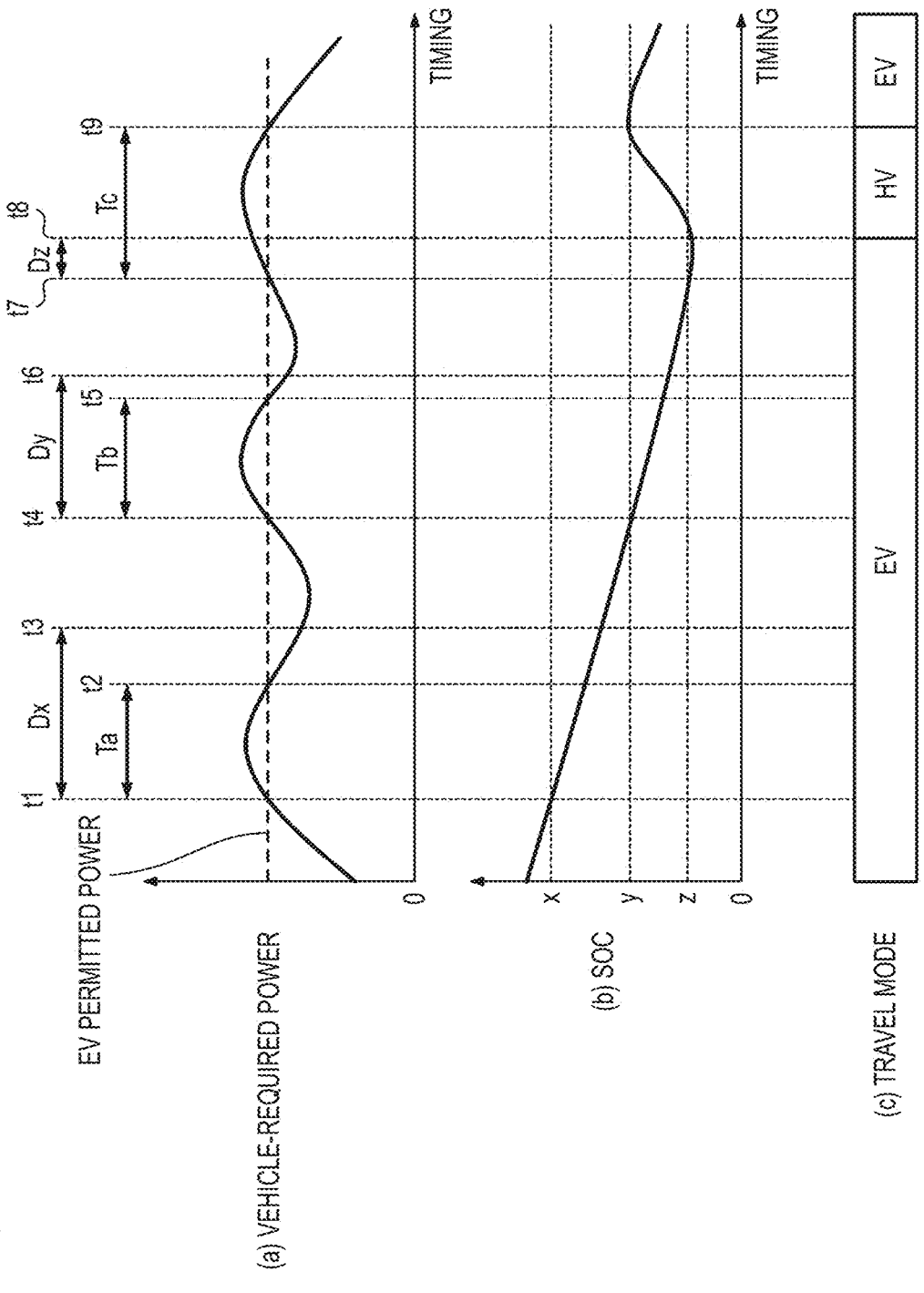
FIG. 4 is a diagram illustrating a specific example of the travel mode transition in the vehicle 10.

In the example illustrated in FIG. 4, a period Ta from a timing t1 to a timing t2, a period Tb from a timing t4 to a timing t5, and a period Tc from a timing t7 to a timing t9 are periods in which the vehicle-required power is higher than the EV permitted power.

At the timing t1, the SOC is "x" (where x>0), and the control device 20 sets a delay time "Dx" (where Dx>0) depending on the SOC referred to as "x". Similarly, at the timing t4, the SOC is "y" (where 0<y<x), and the control device 20 sets a delay time "Dy" (where 0<Dy<Dx) depending on the SOC referred to as "y". At the timing t7, the SOC is "z" (where 0<z<y), and the control device 20 sets a delay time "Dz" (where 0<Dz<Dy) depending on the SOC referred to as "z".

In this example, the timing t2 at which the vehicle-required power becomes equal to or lower than the EV permitted power immediately after the timing t1 is a timing before the timing t3 at which the time "Dx" has elapsed from the timing t1. Therefore, in the period from the timing t1 to the timing t2, although the vehicle-required power exceeds the EV permitted power, the control device 20 maintains the EV travel mode without transitioning to the hybrid travel mode.

Similarly, the timing t5 at which the vehicle-required power becomes equal to or lower than the EV permitted power immediately after the timing t4 is a timing before the timing t6 at which the time "Dy" has elapsed from the timing t4. Therefore, in the period from the timing t4 to the timing t5, although the vehicle-required power exceeds the EV permitted power, the control device 20 maintains the EV travel mode without transitioning to the hybrid travel mode.

On the other hand, the timing t9 at which the vehicle-required power becomes equal to or lower than the EV permitted power immediately after the timing t7 is a timing after the timing t8 at which the time "Dz" has elapsed from the timing t7. In other words, here, although the delay time "Dz" has elapsed from the timing t7 at which the vehicle-required power exceeds the EV permitted power, the vehicle-required power continues exceeding the EV permitted power. Therefore, in this case, the control device 20 transitions from the EV travel mode to the hybrid travel mode. Specifically, for example, the control device 20 sets the vehicle 10 to the hybrid travel mode for the period from the timing t8 when the delay time "Dz" has elapsed from the timing t7 when the vehicle-required power exceeds the EV permitted power to the timing t9 when the vehicle-required power becomes equal to or lower than the EV permitted power.

As described above, when the vehicle 10 is in the EV travel mode, the control device 20 transitions from the EV travel mode to the hybrid travel mode based on continuation for a delay time according to the SOC of the state where the vehicle-required power exceeds the EV permitted power. Thus, it is possible to appropriately perform the transition from the EV travel mode to the hybrid travel mode in consideration of the SOC, and to prevent the NV characteristics and the fuel efficiency of the vehicle 10 from deteriorating due to excessive transitions from the EV travel mode to the hybrid travel mode. This can further contribute to improvement in energy efficiency.

In some cases, the vehicle speed is higher at a later timing (for example, the timing t8 in FIG. 4) than the timing at which the vehicle-required power exceeds the EV permitted power (for example, the timing t7 in FIG. 4), and the vehicle-required power also increases accordingly.

Further, in the vehicle 10, when transitioning from the EV travel mode to the hybrid travel mode, the electric power of the battery BAT is supplied to the second motor-generator MG2, and the second motor-generator MG2 cranks the engine ENG, thereby starting the engine ENG. Therefore, when transitioning from the EV travel mode to the hybrid travel mode, the electric power output from the battery BAT increases depending on the power supply to the second motor-generator MG2.

As described above, when transitioning from the EV travel mode to the hybrid travel mode at a timing after the timing when the vehicle-required power exceeds the EV permitted power, the electric power output from the battery BAT at the time of the transition may become excessively high and accordingly increase the battery loss, which is the power consumption due to the internal resistance of the battery BAT. From the viewpoint of limiting such an increase in the battery loss, it is preferable that to transition from the EV travel mode to the hybrid travel mode before the vehicle-required power becomes excessively high.

Here, the control device 20 may predict the vehicle speed after a predetermined time from the present assuming that the required driving force is generated based on the required driving force and the weight of the vehicle 10, and derive the vehicle-required power using the predicted vehicle speed.

Here, the predetermined time (for example, a predetermined time T illustrated in FIG. 5) is, for example, equal to or shorter than a minimum delay time Dmin that can be derived as the processing result of step S3, and is set in advance by the manufacturer of the vehicle 10 or the like. Accordingly, it is possible to predict a vehicle speed suitable for use in the processing related to the transition from the EV travel mode to the hybrid travel mode as the predicted vehicle speed.

Specifically, in this case, the control device 20 may obtain the TRC rotation speed using the predicted vehicle speed instead of the vehicle speed detected by the vehicle speed sensor 12a (hereinafter also referred to as "actual vehicle speed"), and derive the vehicle-required power using the TRC rotation speed. The predicted vehicle speed can be obtained by, for example, solving a motion pattern formula for the vehicle 10. Hereinafter, the vehicle-required power derived using the actual vehicle speed is also referred to as "actual vehicle-required power", and the vehicle-required power derived using the predicted vehicle speed instead of the actual vehicle speed is also referred to as "predicted vehicle-required power".

Here, an example of the rise of the actual vehicle-required power and the predicted vehicle-required power when the required driving force increases will be described with reference to FIG. 5. In (a) in FIG. 5, a vertical axis represents the required driving force, and a horizontal axis represents a timing. In (b) of FIG. 5, a vertical axis represents the actual vehicle speed and the predicted vehicle speed, and a horizontal axis represents a timing. In (c) of FIG. 5, a vertical axis represents the actual vehicle-required power and the predicted vehicle-required power, and a horizontal axis represents a timing.

Figure 5:
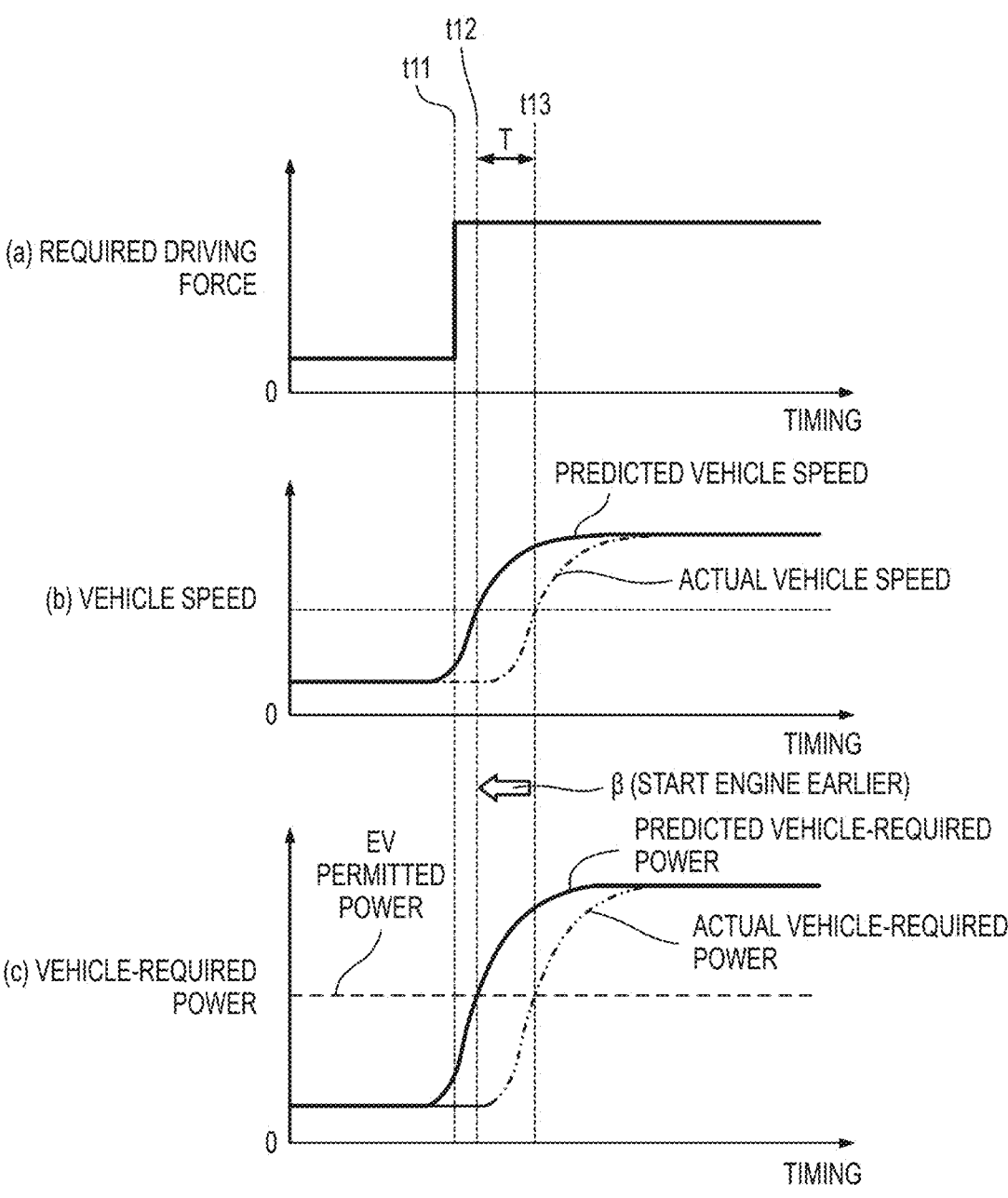
FIG. 5 is a diagram illustrating an example of the rise of an actual vehicle-required power and a predicted vehicle-required power when a required driving force increases.

In the example illustrated in FIG. 5, at a timing t11, the driver of the vehicle 10 presses the accelerator pedal, and the required driving force increases in response to this operation. Normally, even if the required driving force increases as described above, a period lag occurs until the vehicle 10 accelerates (in other words, the actual vehicle speed increases) as illustrated in FIG. 5. Therefore, the rise of the actual vehicle-required power based on the actual vehicle speed is also delayed from the timing t11 when the required driving force increases.

On the other hand, as illustrated in FIG. 5, the predicted vehicle speed rises earlier than the actual vehicle speed by the predetermined time T. Therefore, the predicted vehicle-required power based on the predicted vehicle speed also rises earlier than the actual vehicle-required power by the predetermined time T.

For example, the predicted vehicle speed at a timing t12 immediately after the timing t11 is substantially the same as the actual vehicle speed at a timing t13 when the predetermined time T has elapsed from the timing t12, and the predicted vehicle-required power at the timing t12 is substantially the same as the actual vehicle-required power at the timing t13.

Therefore, by performing the processing related to the transition from EV travel mode to hybrid travel mode using such predicted vehicle-required power, the transition from the EV travel mode to the hybrid travel mode, that is, the start of the engine ENG can be advanced, as illustrated by the white arrow with the reference sign β in FIG. 5. This makes it possible to reduce the electric power output from the battery BAT at the time of transition from the EV travel mode to the hybrid travel mode, and to limit the battery loss at the time of the transition, as compared with the case where the processing related to the transition from the EV travel mode to the hybrid travel mode is performed using the actual vehicle-required power.

Although an embodiment of the present disclosure has been described above, it goes without saying that the present disclosure is not limited to the embodiment. It is apparent that those skilled in the art may conceive of various modifications and changes within the scope described in the claims, and it is understood that such modifications and changes naturally fall within the technical scope of the present disclosure.

The control method described in the present embodiment can be implemented by a computer executing a program (control program) prepared in advance. The control program is stored in, for example, a computer-readable storage medium (for example, the memory 22) and executed by being read from this storage medium. The control program may be provided in a form stored in a non-volatile (non-transitory) storage medium such as a flash memory, or may be provided via a network such as the Internet.

In the present embodiment, the control device 20 is a computer for executing the present control program, and the processor 21 of the control device 20 executes the present control program to realize the control method described above, but the present disclosure is not limited thereto. The computer that executes the present control program is not limited to being provided in the vehicle 10, and may be, for example, included in a server device that can communicate with the vehicle 10 (control device 20).

In the present specification and the like, at least the following matters are described. In the parentheses, the corresponding constituent elements and the like in the above embodiment are shown as an example, but the present disclosure is not limited thereto.

(1) A vehicle control device, in which
the vehicle control device (control device 20) is configured to control a vehicle (vehicle 10) including an internal combustion engine (engine ENG), an electric generator (second motor-generator MG2) configured to be driven by the internal combustion engine, a power storage device (battery BAT), and an electric motor (first motor-generator MG1) configured to drive a drive wheel depending on power supply from at least one of the electric generator or the power storage device,
the vehicle is configured to travel in any travel mode among a plurality of travel modes including a first travel mode of stopping actuation of the internal combustion engine and traveling by the electric motor driving the drive wheel depending on the power supply from the power storage device, and a second travel mode of actuating the internal combustion engine and traveling by the electric motor driving the drive wheel depending on at least the power supply from the electric generator, and
the vehicle control device includes a processor (processor 21) configured to:
when the vehicle is in the first travel mode, transition from the first travel mode to the second travel mode based on continuation of a state for a predetermined delay time, the state being a state where a vehicle-required power required in the vehicle exceeds a threshold, and
change the predetermined delay time depending on a remaining amount of the power storage device.

According to (1), it is possible to limit transitions from the first travel mode to the second travel mode simply because the state where the vehicle-required power exceeds the threshold, even though the remaining amount of the power storage device is abundant. Accordingly, it is possible to limit excessive transitions from the first travel mode to the second travel mode, and to prevent the NV (noise, vibration) characteristics and the fuel efficiency of the vehicle from deteriorating due to such transitions. Further, according to (1), the transition from the first travel mode to the second travel mode can be performed promptly when the remaining amount of the power storage device is not abundant, thereby preventing excessive reduction of the remaining amount of the power storage device.

(2) The vehicle control device according to (1), in which
the processor lengthens the predetermined delay time as the remaining amount of the power storage device increases.

According to (2), it is possible to prevent the NV characteristics and the fuel efficiency of the vehicle from deteriorating due to excessive transitions from the first travel mode to the second travel mode.

(3) The vehicle control device according to (2), in which
the vehicle-required power increases as a required driving force in the vehicle increases, and
the processor shortens the predetermined delay time as a difference between the vehicle-required power and the threshold increases.

According to (3), the transition from the first travel mode to the second travel mode can be performed promptly when the required driving force is great and the vehicle-required power is great. This can prevent the drivability of the vehicle from deteriorating continuously for a long time in the first travel mode in which the required driving force cannot be secured.

(4) In the vehicle control device according to any one of (1) to (3), in which
when the vehicle is in the first travel mode, the processor derives, as the vehicle-required power, a sum of electric power required by the electric motor to cause the vehicle to travel and power consumption by an auxiliary machine included in the vehicle.

According to (4), it is possible to derive more accurate vehicle-required power on the basis of the electric power actually required in the vehicle, and to more appropriately perform various processing using the vehicle-required power.

(5) The vehicle control device according to any one of (1) to (3), in which
the processor predicts, based on a required driving force in the vehicle and a weight of the vehicle, a travel speed of the vehicle after a predetermined time assuming that the required driving force is generated, and derives the vehicle-required power using the predicted travel speed.

According to (5), the timing for transitioning from the first travel mode to the second travel mode is advanced as compared with the case where the vehicle-required power is derived using the actual vehicle speed and the processing related to the transition from the first travel mode to the second travel mode is performed using this vehicle-required power. This can reduce the electric power output from the power storage device during the transition, and can limit the loss caused by the internal resistance of the power storage device during the transition.

(6) The vehicle control device according to (5), in which
the predetermined time is equal to or shorter than the predetermined delay time.

According to (6), it is possible to predict a travel speed suitable for use in the processing related to the transition from the first travel mode to the second travel mode.

The invention claimed is:
1. A vehicle control device, wherein
the vehicle control device is configured to control a vehicle including an internal combustion engine, an electric generator configured to be driven by the internal combustion engine, a power storage device, and an electric motor configured to drive a drive wheel depending on power supply from at least one of the electric generator or the power storage device,
the vehicle is configured to travel in any travel mode among a plurality of travel modes including a first travel mode of stopping actuation of the internal combustion engine and traveling by the electric motor driving the drive wheel depending on the power supply from the power storage device, and a second travel mode of actuating the internal combustion engine and traveling by the electric motor driving the drive wheel depending on at least the power supply from the electric generator, and the vehicle control device includes a processor configured to:

when the vehicle is in the first travel mode, measure an elapsed time during which a vehicle-required power required in the vehicle continues to exceed a threshold;

transition from the first travel mode to the second travel mode when the elapsed time exceeds a predetermined delay time; and change the predetermined delay time depending on a remaining amount of the power storage device.

2. The vehicle control device according to claim 1, wherein the processor lengthens the predetermined delay time as the remaining amount of the power storage device increases.

3. The vehicle control device according to claim 2, wherein the vehicle-required power increases as a required driving force in the vehicle increases, and the processor shortens the predetermined delay time as a difference between the vehicle-required power and the threshold increases.

4. In the vehicle control device according to claim 1, wherein when the vehicle is in the first travel mode, the processor derives, as the vehicle-required power, a sum of electric power required by the electric motor to cause the vehicle to travel and power consumption by an auxiliary machine included in the vehicle.

5. The vehicle control device according to claim 1, wherein the processor predicts, based on a required driving force in the vehicle and a weight of the vehicle, a travel speed of the vehicle after a predetermined time assuming that the required driving force is generated, and derives the vehicle-required power using the predicted travel speed.

6. The vehicle control device according to claim 5, wherein the predetermined time is equal to or shorter than the predetermined delay time.

* * * * *